US012777204B2

(12) United States Patent
Maity et al.

(10) Patent No.: US 12,777,204 B2
(45) Date of Patent: Oct. 27, 2026

(54) CONTEXTUAL TAGS FOR SUPPLEMENTAL CONTENT INSERTION

(71) Applicants: Disney Enterprises, Inc., Burbank, CA (US); HULU, LLC, Santa Monica, CA (US)

(72) Inventors: Sayan Maity, Burbank, CA (US); Timothy Cody, Burbank, NC (US); Yan Zhang, Burbank, CA (US); Fanding Li, Santa Monica, CA (US); Zhe Wang, Burbank, CA (US); Shuyue Li, Burbank, CA (US); Darren Jaspan, Burbank, CA (US); Kaiser Newaj Asif, Burbank, CA (US); Mengzhe Li, Los Angeles, CA (US); David Chia, Burbank, CA (US)

(73) Assignees: Disney Enterprises, Inc., Burbank, CA (US); HULU, LLC, Santa Monica, CA (US)

( * ) Notice: Subject to any disclaimer, the term of this patent is extended or adjusted under 35 U.S.C. 154(b) by 0 days.

(21) Appl. No.: 19/195,664

(22) Filed: Apr. 30, 2025

(65) Prior Publication Data

US 2026/0059150 A1 Feb. 26, 2026

Related U.S. Application Data

(60) Provisional application No. 63/687,295, filed on Aug. 26, 2024.

(51) Int. Cl.
*H04N 21/234* (2011.01)
*G06F 40/284* (2020.01)
(Continued)

(52) U.S. Cl.
CPC ..... *H04N 21/23418* (2013.01); *G06F 40/284* (2020.01); *G06F 40/30* (2020.01); *H04N 21/26603* (2013.01)

(58) Field of Classification Search
None
See application file for complete search history.

(56) References Cited

U.S. PATENT DOCUMENTS

2007/0204310 A1 8/2007 Hua et al.
2010/0280876 A1* 11/2010 Bowra .............. G06Q 30/0251 705/14.69

(Continued)

OTHER PUBLICATIONS

Jacob Devlin et al., "BERT: Pre-training of Deep Bidirectional Transformers for Language Understanding", arXiv:1810.04805v2 [cs.CL], May 24, 2019, 16 pgs.

(Continued)

*Primary Examiner* — Jason K Lin
(74) *Attorney, Agent, or Firm* — Kwan & Olynick LLP

(57) ABSTRACT

In some embodiments, a method determines a prediction network that is trained to map a contextual taxonomy to a standard taxonomy. An indication of a break that is going to be experienced during playback of an instance of main content is received. A client device is playing back the instance of main content. The method determines a set of contextual tags based on content associated with the break in the instance of main content. The prediction network maps the set of contextual tags to a set of standard tags from the standard taxonomy. The method determines an instance of supplemental content based on the set of standard tags. The information to insert the instance of supplemental content in the break during a playback of the instance of main content is provided to the client device.

20 Claims, 13 Drawing Sheets

(51) Int. Cl.
*G06F 40/30* (2020.01)
*H04N 21/266* (2011.01)

(56) References Cited

U.S. PATENT DOCUMENTS

| | | | | |
|---|---|---|---|---|
| 2011/0179445 | A1* | 7/2011 | Brown | H04N 21/812 725/32 |
| 2013/0238419 | A1 | 9/2013 | Glick et al. | |
| 2014/0280549 | A1* | 9/2014 | Rajan | H04L 67/306 709/204 |
| 2017/0213246 | A1* | 7/2017 | Shahan | G06Q 30/0277 |
| 2018/0189289 | A1* | 7/2018 | Wexler | G06F 16/9535 |
| 2020/0204838 | A1* | 6/2020 | Badawiyeh | H04N 21/812 |
| 2022/0038776 | A1* | 2/2022 | Ghavami | H04N 21/26603 |
| 2025/0292308 | A1* | 9/2025 | Vasudevan | G06F 16/335 |
| 2025/0324109 | A1 | 10/2025 | Maalej | |
| 2026/0059150 | A1 | 2/2026 | Maity et al. | |
| 2026/0101073 | A1* | 4/2026 | Hoffert | H04N 21/23424 |

OTHER PUBLICATIONS

Dawn Chmielewski, "Disney harnesses AI to drive streaming ad technology", Reuters, Feb. 9, 2024, 11 pages.
U.S. Appl. No. 19/255,949, filed Jun. 30, 2025.

* cited by examiner

300

302 304 306

| Level | Alt label | Description |
|---|---|---|
| Car wash | | Purpose built structures used for cleaning cars. May also apply to businesses that provide such services. |
| Gas station | Fueling station, charging station | A retail facility where cars can refuel with gasoline. It typically offers fuel pumps, convenience store items, and repairs. Commercial establishments where cars are sold. |
| Bar | Public house, common house, pub | Use for scenes that are located at a counter across which alcholic drinks are served. Often applies to establishments whose primary business is selling alcoholic beverages. |

FIG. 3

400

| Level 0 (402) | Level 1 (404) | Alterative tag (406) | Description (408) |
| --- | --- | --- | --- |
| Creative event | | | Pertains to discernable devices or techniques employed by filmmakers in their work at the scene level. |
| | Animation in live action | | Involves animated characters. |
| | Day dream | Fantasy cut away | Depicts dream-like scenes. |
| Entertainment event | | | An event that stages or presents a form of entertainment. |
| | Audition | | A trial performance in which one showcases her abilities with the hope of earning a role or engagement. |
| | Circus | | An event by a group of professional entertainers comprised of jugglers, acrobats, clowns, etc. |
| | Concert | | A musical performance typically performed in public. |

FIG. 4

500

502 504 506 508

| Level 0 | Level 1 | Level 2 | Description |
|---|---|---|---|
| Engaging in a pastime | | | |
| | Camping | | The activity of staying and sleeping in an outside area for one or more days and nights, usually in a tent |
| | Casual get together | | A small informal gathering, usually designed for two or more people who are all comfortable with each other |
| | | Barbecuing | A social gathering held outdoors |
| | | Dining out | A meal away from home |

FIG. 5

600

| Name (602) | Tier 1 (604) | Tier 2 (606) | Tier 3 (608) | Combined (610) |
| --- | --- | --- | --- | --- |
| Automotive | Automotive | | | Automotive Automotive |
| Auto Body Styles | Automotive | Auto Body Styles | | Auto Body Styles Automotive Auto Body Styles |
| Commerical | Automotive | Auto Body Styles | Commercial Trucks | Commerical Trucks Automotive Auto Body Styles Commercial Trucks |

FIG. 6

| | | |
|---|---|---|
| Activities | Swimming | 1163 |
| Generic Locations | Beach | 1186 |
| Activities | Driving | 1187 |
| States and Conditions | Driving Car | 1187 |

CONTEXTUAL TAGS FOR SUPPLEMENTAL CONTENT INSERTION

CROSS REFERENCE TO RELATED APPLICATIONS

Pursuant to 35 U.S.C. § 119(e), this application is entitled to and claims the benefit of the filing date of U.S. Provisional App. No. 63/687,295 filed Aug. 26, 2024, entitled "SENTIMENT AWARE CONTENT TAGS FOR SUPPLEMENTAL CONTENT INSERTION", the content of which is incorporated herein by reference in its entirety for all purposes.

BACKGROUND

Playback of videos may encounter breaks in which supplemental content may be inserted. Previously, companies used their data, third-party licensed data, and publisher data to reach audiences who are best matched to their customer profile or are similar to their existing customers. Matching users based on viewer segments allows companies to deliver their messages to the viewers whose engagement they value most. Not only do companies use offline data from their customer records, from vendor data sets, and via publisher audiences to reach their intended viewers.

Matching their own data on customer activity with supplemental content usage data, companies are able to verify the effectiveness of their messaging and their viewer strategies. However, the facility to serve and measure matched supplemental content based on viewer personal data and tracked activity is diminishing due both to continuously intensifying regulations and to increasingly protective distribution platform terms. Already in some areas, it is not possible to match supplemental content using data collected from viewers, such as without explicit user consent.

BRIEF DESCRIPTION OF THE DRAWINGS

The included drawings are for illustrative purposes and serve only to provide examples of possible structures and operations for the disclosed inventive systems, apparatus, methods, and computer program products. These drawings in no way limit any changes in form and detail that may be made by one skilled in the art without departing from the spirit and scope of the disclosed implementations.

FIG. 3 depicts a table of an example for location contextual tags according to some embodiments.

FIG. 4 depicts an example of a table describing events for contextual tags according to some embodiments.

FIG. 5 depicts a table that describes activity contextual tags according to some embodiments.

FIG. 6 depicts a table describing standard tags according to some embodiments.

DETAILED DESCRIPTION

Figure 1:
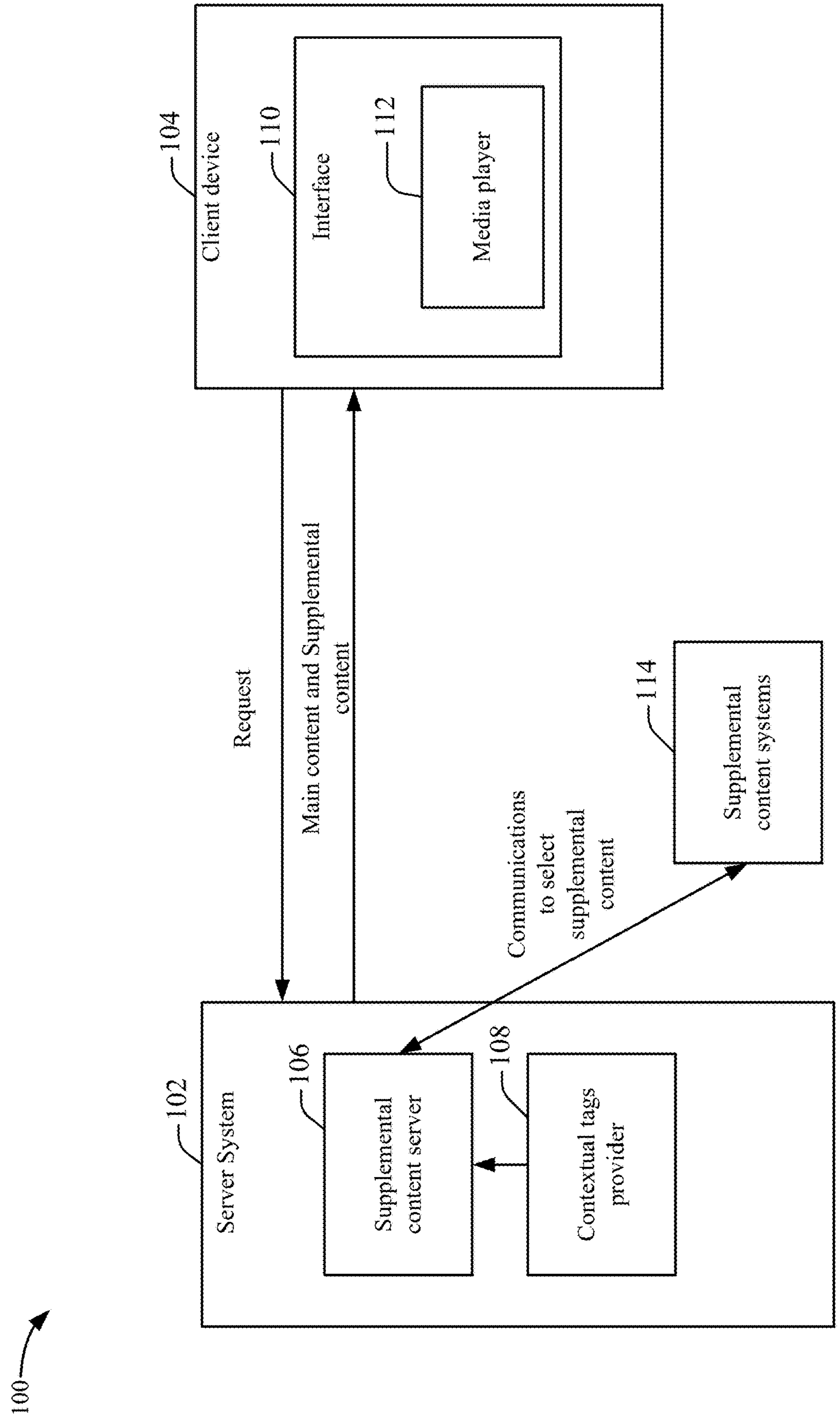
FIG. 1 depicts a simplified system for providing main content and supplemental content according to some embodiments.

Described herein are techniques for a content delivery system. In the following description, for purposes of explanation, numerous examples and specific details are set forth to provide a thorough understanding of some embodiments. In some embodiments as defined by the claims may include some or all the features in these examples alone or in combination with other features described below, and may further include modifications and equivalents of the features and concepts described herein.

System Overview

A system, such as a content delivery system, uses a contextual matching process that allows supplemental content to be matched to instances of main content. Supplemental content that may be content inserted in main content and may be, but not limited to, in-stream promos, live events, advertisements, or other types of supplemental content. The contextual matching process may allow supplemental content to be inserted into breaks of instances of main content where the supplemental content may be contextually relevant to main content around the break, such as main content within a threshold around the break. The contextual matching process may not use user account specific characteristics from a user account that is viewing the instance of main content. In contrast to matching with characteristics of user accounts, companies can match their supplemental content to contexts that are found in the instances of main content.

The system may determine contextual tags in a contextual taxonomy from instances of main content. For example, the system may analyze content associated with supplemental content breaks, such as content within a threshold of a minute, two minutes, three minutes, etc. before or after the supplemental content break. The system may extract contextual tags based on the content around the supplemental content breaks. Also, the system may determine a standard taxonomy. The standard taxonomy may be a defined system of categorization, such as an industry Interactive Advertising Bureau (IAB) taxonomy universe that organizes and categorizes content. Although an IAB taxonomy is described, the system is not limited to using that taxonomy as the standard taxonomy. Rather, the system may develop a standard taxonomy. The contextual taxonomy may include contextual tags that are based on main content being delivered by a content delivery system. The standard taxonomy may not be developed based on the main content being delivered by the content delivery system.

The system may map the contextual tags to the standard tags in the standard taxonomy. This allows the system to use standard tags that companies may recognize. For example, companies may be using the standard taxonomy to map standard tags to their product or service offering to determine instances of supplemental content to insert in a supplemental content break. In some embodiments, the contextual tags in the contextual taxonomy may be appropriate for the system to use to describe main content, but may be too granular for companies that want to insert supplemental content into supplemental content breaks. The mapping allows the supplemental content insertion process to be simplified for companies. This particular way of organizing data improves the efficiency and speed of inserting supplemental content in supplemental content breaks because a standardized taxonomy is used.

To perform the mapping, the system may use a prediction network. In some embodiments, the prediction network includes a language encoder and a classifier. The language encoder may receive contextual tags and generate representations for the contextual tags. The classifier may receive the representations and determine standard tags that correspond to the contextual tags. This maps the contextual tags to the standard tags. The language encoder and the classifier may be trained to be sentiment aware. For example, the sentiment associated with the contextual tags may be represented in the standard tags that are selected by the classifier. In some examples, a supplemental content break in the vicinity of a scene in a movie with an unpleasant cake devouring scene may not be relevant for food brands. The classifier may be trained to use sentiment to determine matches of sentiment that is anti-brand, which results in not selecting the brand for the break.

The above system improves the insertion of supplemental content. As mentioned above, using the standard taxonomy may be more efficient for companies to determine instances of content to insert in a supplemental content break. The companies may determine the instances of supplemental content faster because the standard taxonomy is used. However, the standard taxonomy may not be granular enough to support the service being provided by the system. For example, the system may have a diverse set of content that needs to be described in more granular details. Also, the sentiment may be used to determine standard tags to provide to companies such that supplemental content that may result in negative results is not selected for insertion in a break.

The automatic mapping of contextual tags to standard tags provides many improvements when inserting supplemental content in breaks. For example, the automatic mapping may improve the speed at which supplemental content systems can determine instances of supplemental content for a break. The speed may be important because there is a short amount of time to determine instances of supplemental content when a break in the playback of supplemental content is going to occur. The speed is improved because the context may already be analyzed in portions of main content before the break, and the contextual tags can then be mapped to standard tags. The standard tags are already configured by companies to use to select the instances of supplemental content for the break.

The language encoder and the classifier are also trained to improve the mapping between contextual tags and standard tags. The language encoder is observable where the system has visibility how the contextual tags are mapped to the standard tags (via parameter values). Also, the weights may be adjusted for contextual tags based on the contribution of the respective contextual tag's importance to the supplemental content break. For example, the system can control parameter weights that are applied in the classifier to weight contextual tags that are associated with the supplemental content break differently. Further, the mapping from contextual tags to standard tags automatically allows instances of supplemental content to be determined in the limited amount of time when a supplemental content break is going to be encountered during playback of the main content.

System

FIG. 1 depicts a simplified system 100 for providing main content and supplemental content according to some embodiments. System 100 includes a server system 102 and a client device 104. Although single instances of server system 102 and client device 104 are shown, multiple instances of server system 102 and client device 104 may be appreciated. For example, multiple client devices 104 may be requesting main content from a single server system 102 or multiple server systems 102.

Server system 102 may facilitate the delivery of main content to client device 104. For example, server system 102 may communicate with multiple content delivery networks (not shown) to have main content delivered to multiple client devices 104. A content delivery network includes servers that can deliver main content to client device 104. The content may be video, audio, or other types of content. Video may be used for discussion purposes, but other types of content may be used in place of video. In some embodiments, a content delivery network delivers segments of video to client device 104. The segments may be a portion of the video, such as six seconds of the video.

Client device 104 may include a mobile phone, smartphone, set top box, television, living room device, tablet device, or another computing device. Client device 104 may include a media player 110 that is displayed on an interface 112. Media player 110 or client device 104 may request content from the content delivery network.

Supplemental content server 106 may receive a request for supplemental content during the playback of main content. The main content may be the content that is requested by client device 104, such as a movie, show, etc. An instance of main content may have multiple breaks. The supplemental content may be inserted in a break of the main content. The break may be X seconds or minutes long and multiple instances of supplemental content may be inserted in a break. The instances of supplemental content to insert may be determined dynamically when a request indicating a supplemental content break is going to be experienced or encountered during playback of main content is received from client device 104. Although video is described, supplemental content may also be inserted in other ways, such as in a window of a website.

Contextual tags provider 108 determines contextual tags from main content. For example, contextual tags provider 108 analyzes content around supplemental content breaks in the main content. Contextual tags provider 108 may use a machine learning process to detect contextual tags based on multiple modalities of the main content (e.g., video, audio, text, etc.). A contextual tag may be information that describes a context of the main content. The machine learning process may analyze content around a break to determine contextual tags. The content around a break may be within a threshold, such as 60 seconds, 2 mins, etc. before a break, after a break, or a combination of before and after the break.

When a break is going to be encountered, contextual tags provider 108 may determine contextual tags for the break, such as the contextual tags are retrieved from storage. Contextual tags provider 108 maps the contextual tags to standard tags in a standard taxonomy. In some embodiments, contextual tags provider 108 uses a prediction network that maps the contextual tags to standard tags. In some embodiments, the prediction network may include a language encoder that maps contextual tags to representations, and a classifier that classifies the representations in standard tags. In some embodiments, contextual tags provider 108 may determine contextual tags before playback starts, such as offline. For example, for video on demand content, contextual tags provider 108 can determine contextual tags before the release of the content. In other embodiments, contextual tags provider 108 may determine contextual tags in real-time as playback is occurring. For example, in live content that is being streamed in real-time, contextual tags provider 108 may determine contextual tags as the content is received for delivery to client devices. In some embodiments, contextual tags provider 108 may determine contextual tags for all the content. This may allow contextual tags provider 108 to determine contextual tags for any break that may occur in the content, such as breaks that randomly occur. For example, breaks may occur when client devices pause playback.

Contextual tags provider 108 provides the standard tags to supplemental content server 106. Then, supplemental content server 106 provides information to supplemental content systems 114 based on standard tags. This allows supplemental content systems 114 to provide information for instances of supplemental content for insertion in the main content. Different configurations of supplemental content systems 114 may be appreciated. Examples of supplemental content systems 114 may be described in U.S. Patent Application No. 19/255,949, entitled "CONTEXTUAL SUPPLEMENTAL CONTENT INSERTION AND OPTIMIZATION", filed Jun. 30, 2025, which claims priority to U.S. Provisional Application No. 63/687,296, filed Aug. 26, 2024, all of which is incorporated by reference in its entirety for all purposes. Then, supplemental content server 106 provides information for the instances of supplemental content to client device 104 for insertion in the break during playback of the main content.

The following will now describe the use of contextual tags and standard tags to perform insertion of the instances of supplemental content in the break.

Standard Tag Insertion for Supplemental Content Insertion

Figure 2:
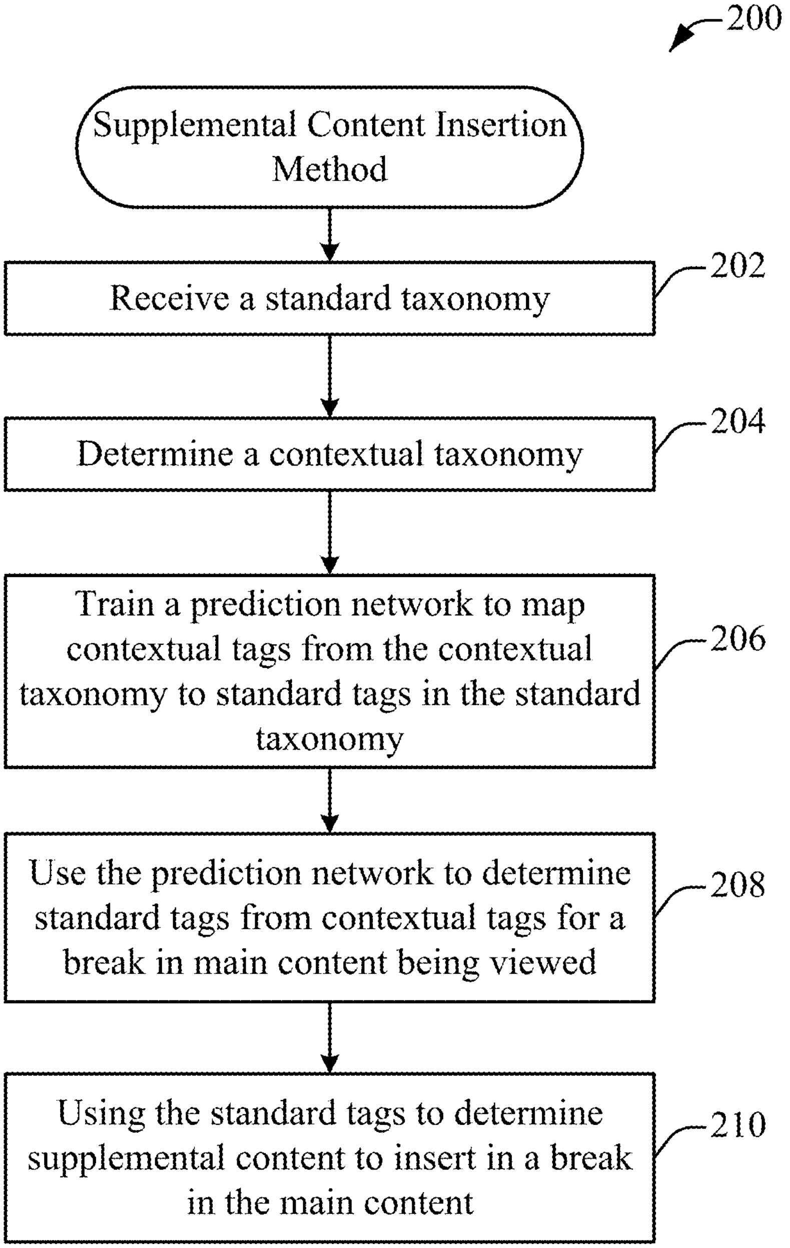
FIG. 2 depicts a simplified flowchart of a method for performing supplemental content insertion according to some embodiments.

FIG. 2 depicts a simplified flowchart 200 of a method for performing supplemental content insertion according to some embodiments. At 202, contextual tags provider 108 receives a standard taxonomy. The standard taxonomy may be a standardized taxonomy, such as the IAB taxonomy, which provides a common language that can be used when segmenting and categorizing content or describing content, such as the main content. The standard taxonomy may be a taxonomy that multiple companies use to describe the context of content. The standard taxonomy may be hierarchical and provides standard tags for use at various granularities based on an entity's service and product offerings.

At 204, contextual tags provider 108 determines a contextual taxonomy. The contextual taxonomy may be based on contextual tags that contextual tags provider 108 uses to describe main content that is being delivered to client devices 104 by the content delivery system. The contextual taxonomy may be different from the standard taxonomy. For example, the standard taxonomy may not be granular enough to support the description of main content being delivered by the content delivery system. The contextual taxonomy allows the content delivery system to describe content around supplemental content breaks with more granularity.

At 206, contextual tags provider 108 trains a prediction network to map contextual tags from the contextual taxonomy to standard tags in the standard taxonomy. In some embodiments, contextual tags provider 108 may train a language encoder to encode contextual tags to representations. Then, contextual tags provider 108 may train a classifier that classifies the representations to standard tags. The training will be discussed in more detail below.

After training the prediction network, the prediction network may be used to map contextual tags to standard tags for insertion of supplemental content in a break and main content being viewed. At 208, contextual tags provider 108 uses the prediction network to determine standard tags that are mapped from contextual tags. For example, contextual tags provider 108 may determine contextual tags that are associated with a supplemental content break that will be encountered during playback of main content. For example, the content may have been previously analyzed and contextual tags were extracted and stored. Then, contextual tags provider 108 inputs the contextual tags into the language encoder. Representations output by the language encoder are input into the classifier, which maps the representations to standard tags.

At 210, contextual tags provider 108 uses these standard tags to determine supplemental content to insert in a break in the main content. In some embodiments, contextual tags provider 108 provides information for the standard tags to supplemental content server 106. Then, supplemental content server 106 sends the standard tags to supplemental content systems 114. Depending on the various system configuration that is used, an entity may provide information for instances of supplemental content that match the standard tags. Supplemental content server 106 can determine instances of supplemental content. Then, once determining the instances of supplemental content to insert, supplemental content server 106 provides information to client device 104 to have the instances of supplemental content inserted in the break. For example, the information may be links to the instances of supplemental content, which client device 104 uses to retrieve the supplemental content.

The following will now describe examples of contextual tags and standard tags according to some embodiments. Although the following contextual tags and standard tags are described, other contextual tags and standard tags may be appreciated.

Contextual Tags and Standard Tags

Contextual tags provider 108 analyzes portions of the instance of main content around supplemental content breaks to determine contextual tags. Contextual tags provider 108 may detect contextual tags based on multiple modalities of the instance of main content. The multimodal processes may receive the instance of main content with the associated supplemental content markers that define where a supplemental content break is located in the main content. For example, the markers may indicate a break starts at 10:00 minutes and ends at 12:30 minutes. Contextual tags provider 108 may output a collection of contextual tags for the supplemental content breaks based on analyzing portions of the main content before or after the supplemental content breaks. The multimodal approach may perform feature extraction based on audio, text, or visual components of the instance of main content. The ensemble of processes may be executed in tandem to analyze different mediums of the main content to extract context from the content. Contextual tags provider 108 may parse the mode of content, such as dialogue lines, video frames, or video clips, extract features, and classify the features with contextual tags. Then, contextual tags provider 108 may aggregate the results from the different portions of the main content.

For audio context, an ensemble of machine learning models may be used to extract metadata for sound recognition (e.g., voice tone and sound effects), and classification (e.g., music genre and music emotion). For a dialogue context, an ensemble of natural language process (NLP) models may be used to extract sentiment, emotion, and topic classification of dialogue lines. The dialogue can be determined by two methods: automatic speech recognition and/or respective closed caption metadata files. For visual context, an ensemble of computer vision models may be used to extract metadata based on generic object detection (e.g., localized detection of generic objects in a video frame—such as hamburgers, bicycles, but not specific objects (e.g., sword), image classification (e.g., classifying video frames) and video classification (e.g., classifying video frames). The extracted metadata is used to determine contextual tags that are relevant to the main content.

To detect brand placement in video, an object detection (e.g., computer vision algorithm that detects localized objects) algorithm identifies products and/or logos that are strategically placed in video content. Companies can strategically place brand artifacts (e.g., signs, billboards, and product labels) and/or products in video content. The detection algorithm identifies the temporal segments where the brand is placed throughout the main content. To identify these brand segments, the algorithm parses video into images/frames based on a predefined frame rate selection (e.g., 3 frames per second). An object detection machine learning model is applied to each image to identify the location of each object. The model outputs standard localized detection metrics such as the prediction label, bounding box coordinates, bounding box area, and brand label. The model is uniquely trained on images with logos and/or products that are intended to be clearly identified by the main content's viewers. Using the frame index (or correlated timestamp), the machine learning output is converted to metadata representing the video segments where the placed brand artifacts are located. Adjacent segments are joined if they are within a prescribed distance or tolerance (e.g., 1 second). A relevancy score is derived from the output metrics as an aggregate computation across segments containing a placed brand.

Contextual tags provider 108 creates an affinity graph between the contextual tags that can be used to determine sentiment aware standard tags. Based on the taxonomy, contextual tags provider 108 may have parent level categories. In some examples, the parent level categories are pets, food, cars, and household products. Contextual tags provider 108 associates contextual tags to parent level categories. For example, the contextual tags detected for a break are associated with parent level categories. The association may be classified with an affinity, such as a strong affinity or a weak affinity. The contextual tags may describe different contexts, such as locations, objects, dialogue, actions, etc. in the main content. In some examples, the contextual tags may be grouped by parent level categories, such as the contextual tags of dog food, pizza, energy drink, and apple are grouped with pets and trash and mold are grouped with household products.

An example of a contextual tag is "dog food. The contextual tag of dog food has a strong affinity for the parent category of pets, but a weak affinity for the parent category of food. This is because dog food is normally associated positively with pets, but negatively as human food. Similarly, a contextual tag drive-through has a strong affinity with the parent category of food, but a weak affinity to the parent category of cars. Here, drive-through is normally associated with food, but not so much with the driving of cars.

Contextual tags provider 108 may also assign contextual tags positive associations or negative associations. The positive associations or negative associations may be linked to contextual tags that are linked to parent categories. For example, the contextual tag "trash" is a positive association for the household products category, but a negative association for the food parent category. Positive associations and negative associations may be used to ensure brand safety. For example, a fast food restaurant entity might want to insert supplemental content next to an eating contextual tag; however, the entity might want to exclude inserting supplemental content and breaks that have been tagged with the vomiting contextual tag.

The following will describe different examples of contextual tags and standard tags. FIG. 3 depicts a table 300 of an example for location contextual tags according to some embodiments. Table 300 may include columns that describe a hierarchical structure of the contextual tags. For example, a column 302 may describe contextual tags of car wash, gas station, and bar. A column 304 describes an alternate label for the contextual tag. For example, gas station may have an alternative contextual tag of fueling station or charging station. A column 306 may provide a description of the contextual tag. For example, the car wash contextual tag includes a description of "Purpose built structures used for cleaning cars. May also apply to businesses that provide such services."

FIG. 4 depicts an example of a table 400 describing events for contextual tags according to some embodiments. The contextual tags may be organized in a hierarchy. In this example, the hierarchy may be level 0 and level 1, but other numbers of levels may be appreciated. Level 1 may be a child hierarchy for the parent of level 0.

A column 402 describes contextual tags for a level 0 in the hierarchy. Level 0 includes the contextual tags of creative event and entertainment event. A column 404, level 1, includes additional child contextual tags for the parent level tags. For example, for creative event, the contextual tags of animation in a live action and daydream are included.

A column 406 may include an alternative tag. For example, the day dream tag may include an alternative contextual tag of fantasy cut away.

A column 408 may include a description of the contextual tags. For example, the creative event contextual tag may include a description of "Pertains to discernible devices or techniques employed by filmmakers in their work at the scene level." Or the animation in live action contextual tag includes the description of "Involves animated characters."

FIG. 5 depicts a table 500 that describes activity contextual tags according to some embodiments. The activities contextual tags may be organized in a hierarchy of level 0, level 1, and level 2. For example, in a column 502, level 0 contextual tags include activities of engaging in a pastime. In a column 504, level 1 contextual tags include camping and casual get together. In a column 506, level 2 contextual tags for casual get together may include barbecuing and dining out. In a column 508, a description of the contextual tags may be provided. For example, the contextual tag of camping may include the description of "The activity of staying and sleeping in an outside area for one or more days and nights, usually in a tent".

FIG. 6 depicts a table 600 describing standard tags according to some embodiments. The standard tags may also be organized in a hierarchy. For example, a column 602 describes the name of the contextual tag. Columns 604, 606, and 608 describe different levels of the hierarchy, such as tier 1, tier 2, and tier 3 levels.

At 610, a concatenated tiers level may combine the standard tags from all the levels. For example, the combined automotive standard tag may be "Automotive Automatic" standard tag that combines the two Automotive tags in the Name and tier 1 level. The Auto Body Styles standard tag may have a tier 1 standard tag of Automotive and a tier 2 standard tag of Auto Body Styles. The combined standard tag may be "Auto Body Styles Automotive Auto Body Styles".

The standard tags may not be granular enough to support the contextual tags. For example, the contextual tags described in FIGS. 3, 4, and 5 may describe main content in a more granular way, and also include detailed descriptions. The detailed descriptions may be used in training of the prediction network, which will be described below. The standard tags may not describe the main content in that much granularity. However, companies may use standard tags to insert supplemental content into supplemental content breaks. Accordingly, the mapping between contextual tags and standard tags is used to allow the contextual tags and standard tags to be used. The following will describe the mapping of contextual tags to standard tags for a supplemental content break.

Prediction Network

Figure 7:
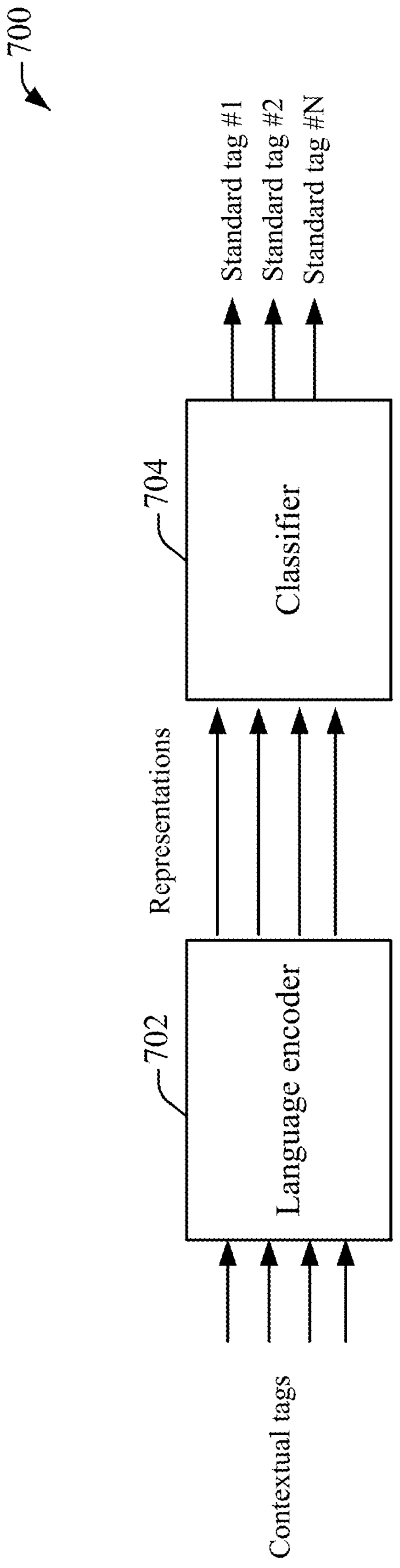
FIG. 7 depicts an example of a prediction network that maps contextual tags to standard tags according to some embodiments.

FIG. 7 depicts an example of a prediction network 700 that maps contextual tags to standard tags according to some embodiments. A language encoder 702 is configured to map contextual tags to representations of the respective contextual tags. In some embodiments, a bidirectional encoder representations from transformers (BERT) model may be used as language encoder 702. Language encoder 702 operates by first tokenizing input tags into individual words or subwords, which are then embedded into numerical vectors. These vectors are fed into a multi-layer bidirectional transformer encoder, which simultaneously analyzes the entire input sequence in both forward and backward directions (e.g., bidirectional) to capture contextual relationships between tokens. The output is a set of vectors that encode the contextual tags semantic content.

Language encoder 702 may receive contextual tags as inputs. In some embodiments, the contextual tags that are found in a time period associated with a supplemental content break may be input into language encoder 702. For example, five contextual tags may be extracted from main content for a break. Then, a first contextual tag is input into a first input, a second contextual tag is input into a second input, etc.

Language encoder 702 uses natural language processing to understand and interpret the contextual tags. Language encoder 702 outputs representations for the contextual tags based on the analysis. In some embodiments, the representations may be in a space, such as a higher dimensional space, compared to the input space. In some embodiments, the representations may be embeddings, which may be vectors of a number of dimensions. An example of a representation may be [0.2, 0.4, 0.9, . . . , 0.3], which may be a vector for a representation. Each output may be a vector representation for a corresponding input.

The representations may be input into a classifier 704, which maps representations to standard tags. In some embodiments, classifier 704 includes one or more outputs that may output one or more standard tags. For example, based on the representations that are input, classifier 704 outputs one or more standard tags, such as three standard tags with the three highest scores. For example, classifier 704 may determine scores for standard tags in the standard taxonomy that rate the relevance of the standard tags to the contextual tags. For example, a higher score for a respective standard tag may indicate it may be more relevant to the representations that have been input. Here, standard tag #1, standard tag #2, and standard tag #N may be output. In some embodiments, a contextual tag may be "car wash", and a standard tag may be "automotive".

Figure 8:
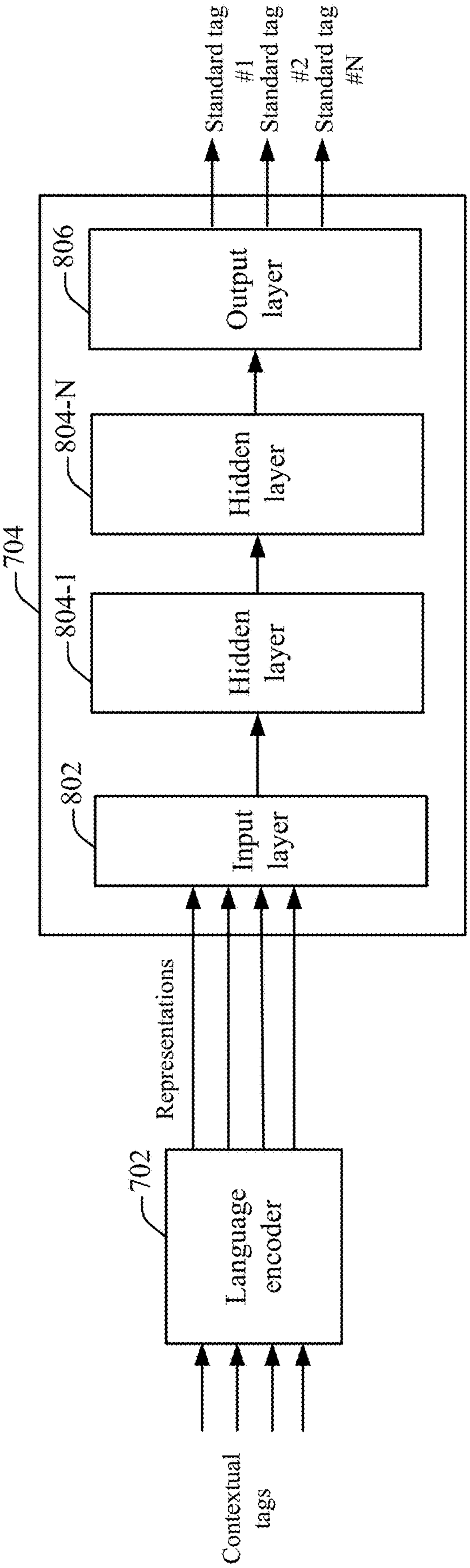
FIG. 8 depicts more detailed example of a classifier according to some embodiments.

FIG. 8 depicts more detailed example of classifier 704 according to some embodiments. Classifier 704 includes an input layer that input layer 802 that receives representation from language encoder 702. For example, four inputs are shown here, but different numbers of inputs may be appreciated. In some embodiments, the number of representations that are input into classifier 704 equals the number of contextual tags that are input into language encoder 702.

A number of hidden layers 804-1 to 804-N are included. The number of nodes in the hidden layers may vary, such as a hidden layer may include five nodes, another hidden layer may include 7 nodes, etc. Weights may be applied to interconnections between the nodes. For example, the nodes may be interconnected to all other nodes between layers. Weights may be applied by weighting the values being propagated through the nodes. The value of the weights that may be applied may be based on the relationship of the contextual tag to the break. A determination of weights will be described in FIG. 9.

After the hidden layers, an output layer 806 generates the output of standard tags. In some embodiments, three outputs may be used that may output the three standard tags in which the contextual tags are mapped. Output layer 806 may select the three standard tags that have the three highest scores. The scores may also be output to indicate the relevance of the standard tags to the contextual tags. Although three outputs are described, other numbers of outputs may be appreciated. Also, the output format may be different. For example, scores for all of the standard tags may be output. Then, some standard tags may be selected based on their respective scores. Using the language encoder allows classifier 704 to operate in the representation space, which is in a higher dimension than the input space.

Figure 9:
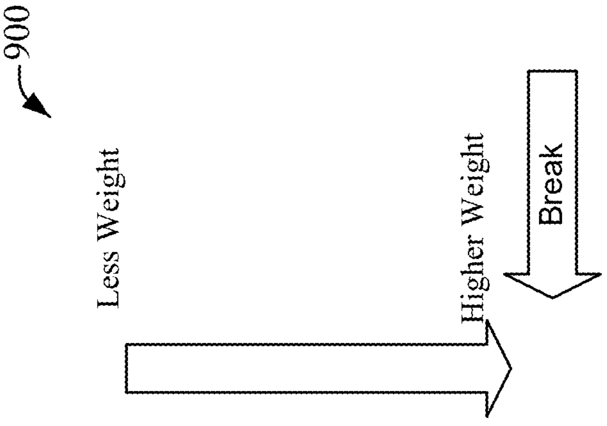
FIG. 9 depicts an example of a method for determining weights for contextual tags according to some embodiments.

FIG. 9 depicts an example 900 of a method for determining weights for contextual tags according to some embodiments. The contextual tags are shown at 902 and 904. For example, the contextual tags may include level 0 and level 1 contextual tags. At 906, the time in the main content in which the contextual tag is detected is shown. After time 1187, the break in the main content is shown.

In some embodiments, contextual tags provider 108 uses the distance from the supplemental content break to determine the weights. For example, contextual tags provider 108 may provide less weight to contextual tags that are farther away from the supplemental content break compared to providing a higher weight for contextual tags that are closer to the supplemental content break. Other methods of determining the weights may also be used. For example, if a contextual tag is determined to be more relevant to the content before the supplemental content break, then a higher weight may be used. If the contextual tag is for a car, and the car is the main object in the main content, a higher weight may be given to contextual tags for a car and driving a car.

The following will describe the training of language encoder 702 and classifier 704 in more detail.

Training of Language Encoder

Figure 10:
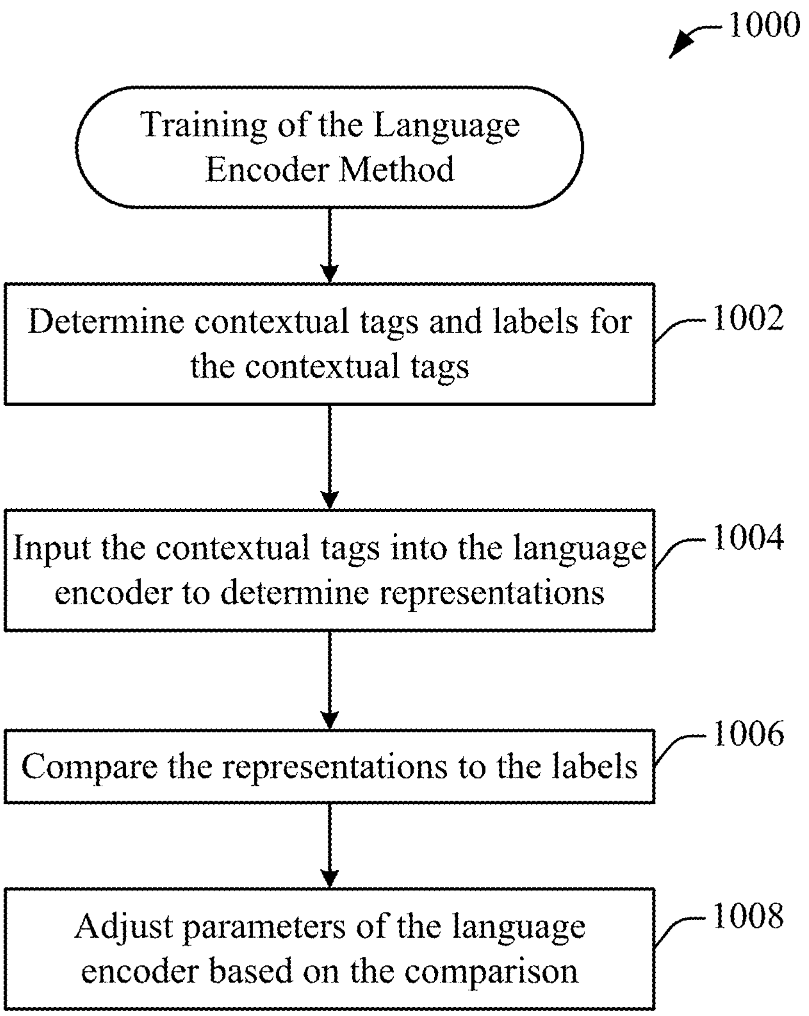
FIG. 10 depicts simplified flowchart of a method for training a language encoder according to some embodiments.

FIG. 10 depicts simplified flowchart 1000 of a method for training language encoder 702 according to some embodiments. In some embodiments, language encoder 702 may be pre-trained and fine tuning of the language encoder may be performed using contextual tags specific to the content delivery system and the main content being offered for delivery.

At 1002, contextual tags provider 108 determines contextual tags and labels for the contextual tags. For example, contextual tags may be extracted from main content. Then, an encoder may be used to represent the feature and will be used to determine the labels for the contextual tags by inferencing the trained model of the encoder. The labels may be representations of the contextual tags.

At 1004, contextual tags provider 108 inputs the contextual tags into language encoder 702 to determine representations. Also, the descriptions for the contextual tags may be input into language encoder 702. The descriptions may be used by language encoder 702 to enrich the context when preparing the feature representation when training classifier 704.

The representations may be the values that are typically input into classifier 704. However, these representations are used to train language encoder 702. At 1006, contextual tags provider 108 compares the representations to the labels. For example, a difference (e.g., a loss) between a representation that is generated for a contextual tag and the respective label is determined.

At 1008, contextual tags provider 108 adjusts parameters of language encoder 702 based on the comparison in a feedback loop. For example, contextual tags provider 108 may minimize the loss between the difference by backpropagation to compute gradients and update the model's parameters of language encoder 702 (e.g., weight and biases). This may cause language encoder 702 to output a representation that is closer to the label based on the adjustment of the value of the parameters. This process may be iterate over multiple epochs until language encoder 702 converges to achieve an objective success criterion.

Training of the Classifier

Figure 11:
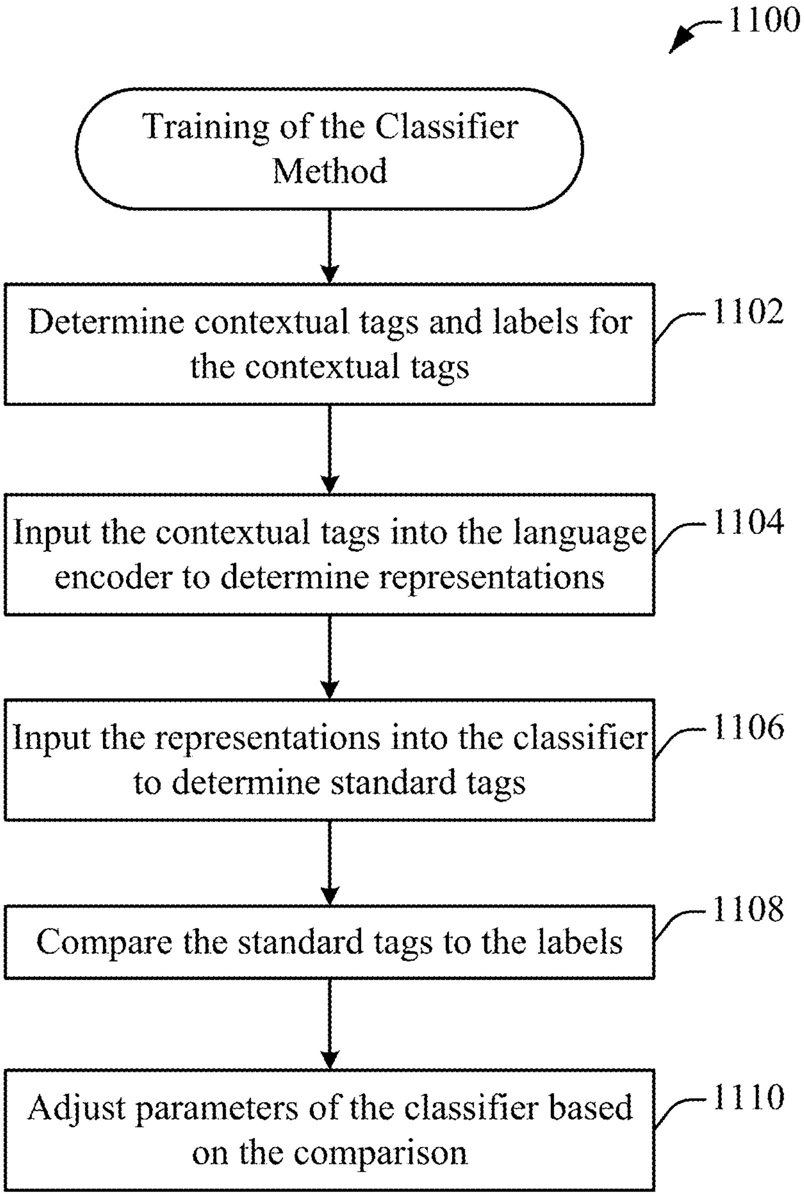
FIG. 11 depicts a simplified flowchart of a method for training the classifier according to some embodiments.

Classifier 704 may be trained, such as after training of language encoder 702. FIG. 11 depicts a simplified flowchart 1100 of a method for training classifier 704 according to some embodiments. At 1102, contextual tags provider 108 determines contextual tags and labels for the contextual tags. The contextual tags may be similar contextual tags as described in FIG. 10. For example, the contextual tags may be based on the main content being delivered by the content delivery service. However, other contextual tags may also be used. The labels in this case, however, may be the standard tags in which the contextual tags should be mapped. This is different from the labels of the representations for training of language encoder 702.

At 1104, contextual tags provider 108 inputs the contextual tags into language encoder 702 to determine representations. In some embodiments, language encoder 702 has been fine-tuned as described in FIG. 10 to output the representations.

At 1106, contextual tags provider 108 inputs the representations into classifier 704 to determine standard tags. The standard tags may be mapped from the contextual tags. For example, three standard tags may be output.

At 1108, contextual tags provider 108 compares the standard tags to the labels. For example, the comparison may compare which standard tags are output or the scores that are output for the standard tags. An example of the standard tag may be "car", which is compared to a label of "automotive". The difference between the standard tag and the label may be used to train classifier 704.

At 1110, contextual tags provider 108 adjusts the parameters of classifier 704 based on the comparison. For example, contextual tags provider 108 may minimize the difference by adjusting the parameters such that classifier 704 output standard tags that are closer to the labels.

The above training may optimize the mapping between contextual tags and standard tags. By training the language encoder 702 to output more accurate representations first, the representations that are input into classifier 704 may be improved. Then, using the language encoder 702 and classifier 704 together may improve the mapping from contextual tags to standard tags. Some standard tags may not have a defined context. The training may help classifier 704 to learn contextual relevance of the standard tags.

In some embodiments, a semantic textual similarity matrix is used to perform the classification from mapping the representations to the standard tags. The semantic textual similarity matrix may be a representation that captures a degree of semantic similarity between the contextual tags and the standard tags. In some embodiments, the matrix may be determined based on encoding contextual tags into the latent space and encoding standard tags into the latent space. Then, distances from the contextual tags and standard tags may be used to determine the semantic textual similarity matrix. The matrix is learned during the training phase and used during the inference stage. This matrix can be subsequently updated when language encoder 702 and classifier 704 are retrained.

Once language encoder 702 and classifier 704 are trained, they can be used to determine standard tags during or for the insertion of supplemental content in a supplemental content break.

Supplemental Content Insertion

Figure 12:
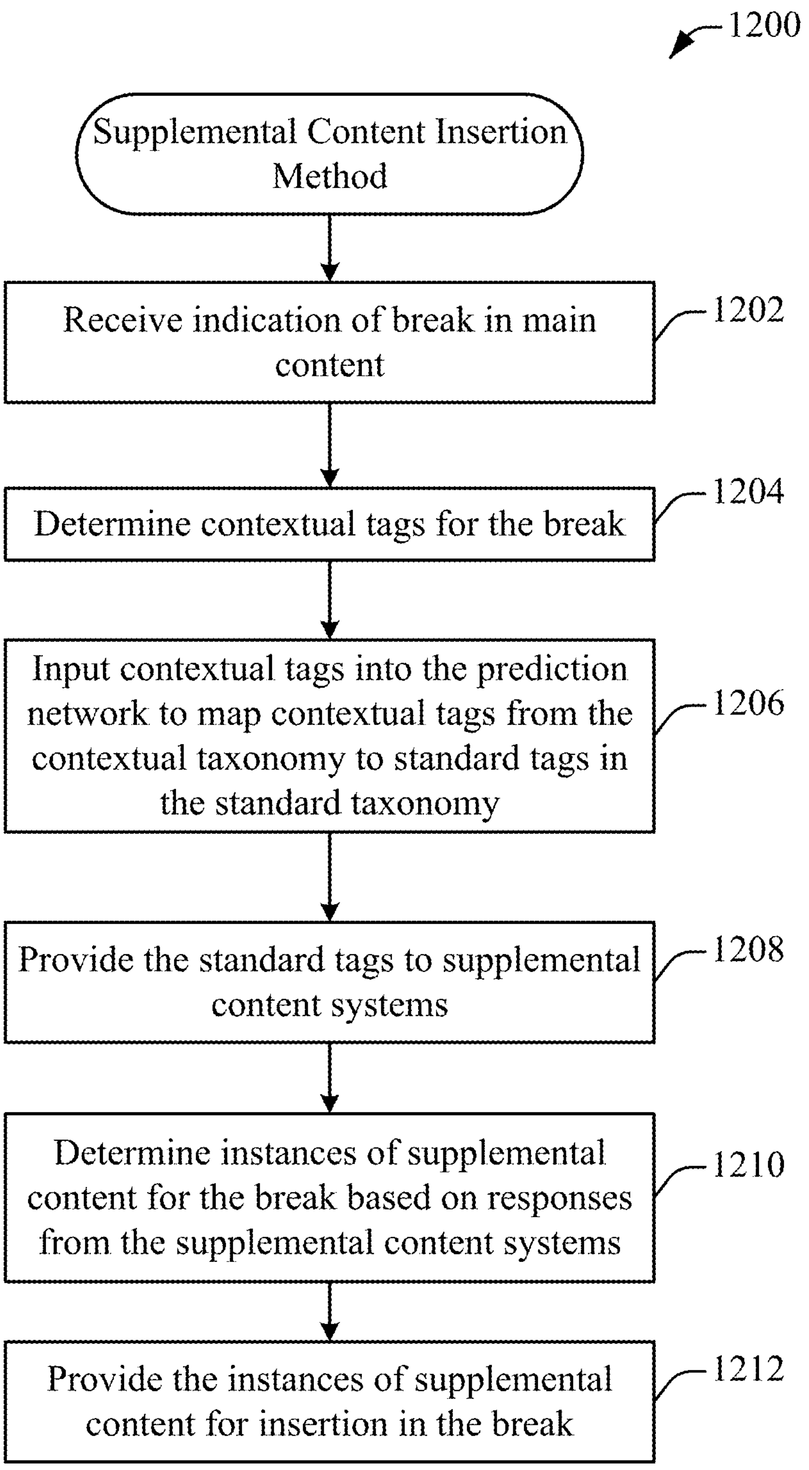
FIG. 12 depicts a simplified flowchart for a method for determining supplemental content for insertion in supplemental content breaks according to some embodiments.

FIG. 12 depicts a simplified flowchart 1200 for a method for determining supplemental content for insertion in supplemental content breaks according to some embodiments. At 1202, supplemental content server 106 receives an indication of a break. For example, client device 104 may be playing back an instance of main content. Before the break is reached, such as at the five minute mark of playback, an indication that a break is upcoming is sent by client device 104 to supplemental content server 106. Also, an indication that a pause in the playback is received may be provided instead of the indication of the break. The following process may be performed when the pause is received.

At 1204, contextual tags provider 108 determines contextual tags for the break. For example, the main content may have been analyzed to extract contextual tags from the break.

At 1206, contextual tags provider 108 inputs the contextual tags into prediction network 700 to map the contextual tags from the contextual taxonomy to standard tags in the standard taxonomy. The mapping may be performed as described above using language encoder 702 and classifier 704. In some embodiments, the contextual tags were detected in the main content before the break are input into language encoder 702, which outputs representations for the contextual tags. Then, the representations are input into classifier 704, which maps the representations to standard tags that are output. In some embodiments, the standard tags with the highest rankings, such as with the highest confidence. In some embodiments, the standard tags with the highest three confidence scores may be output.

At 1208, supplemental content server 106 provides the standard tags to supplemental content systems 114. Supplemental content systems 114 may include different configurations that are used to determine the instances of supplemental content to insert in the supplemental content break.

At 1210, supplemental content server 106 determines instances of supplemental content for the supplemental content break based on the responses from supplemental content systems 114. For example, the responses may provide a selection of instances of supplemental content, may provide opportunities for instances of supplemental content in which supplemental content server 106 may select one of the instances based on the opportunities, or other responses may be provided.

At 1212, supplemental content server 106 provides information for the instances of supplemental content to client device 104 for insertion in the break. For example, links to the instances of supplemental content may be provided to client device 104, which uses the links to retrieve the instances of supplemental content when the break is encountered. Then, the instances of supplemental content are played back at client device 104.

Conclusion

Accordingly, the mapping of contextual tags to standard tags may provide more relevant instances of supplemental content for insertion in the break. The language encoder and classifier may be trained to improve the classification process. This results in an improvement in the selection of instances of supplemental content that may be relevant to content around the supplemental content break. Also, the speed at which instances of supplemental content can be determined is improved using the mapping by allowing standard tags to be used.

System

Figure 13:
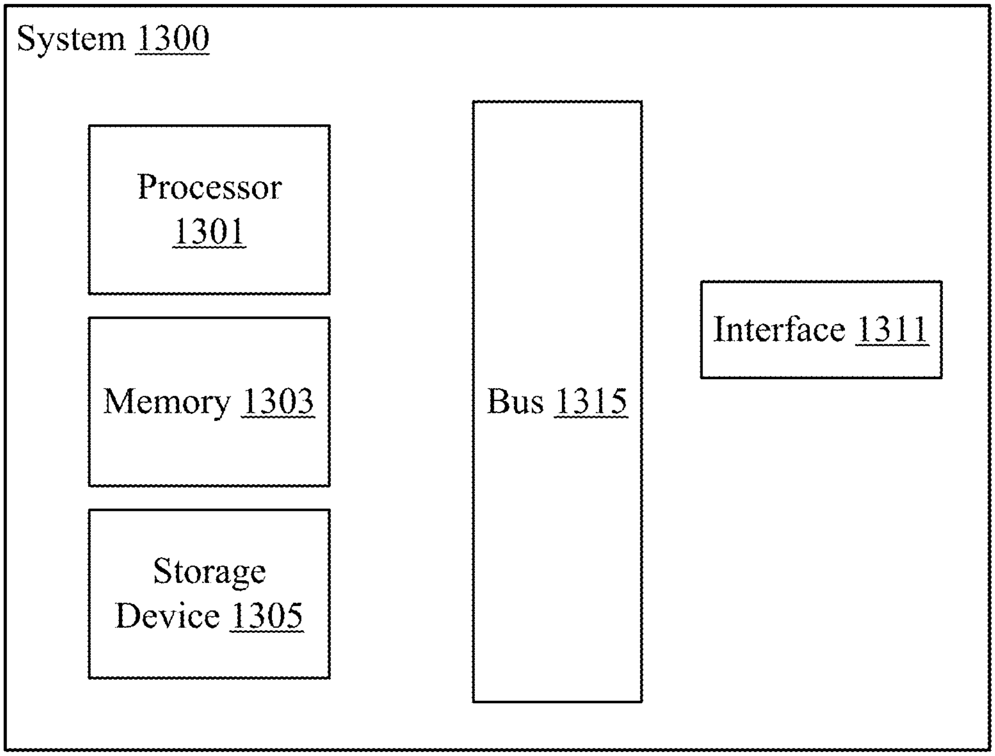
FIG. 13 illustrates one example of a computing device according to some embodiments.

FIG. 13 illustrates one example of a computing device according to some embodiments. According to various embodiments, a system 1300 suitable for implementing embodiments described herein includes a processor 1301, a memory 1303, a storage device 1305, an interface 1311, and a bus 1315 (e.g., a PCI bus or other interconnection fabric.) System 1300 may operate as a variety of devices such as any device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. Memory 1303 may be random access memory (RAM) or other dynamic storage devices. Storage device 1305 may include a non-transitory computer-readable storage medium holding information, instructions, or some combination thereof, for example instructions that when executed by the processor 1301, cause processor 1301 to be configured or operable to perform one or more operations of a method as described herein. Bus 1315 or other communication components may support communication of information within system 1300. The interface 1311 may be connected to bus 1315 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities. In some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims.

Based on the above disclosure and the following claims, other arrangements, embodiments, implementations, and equivalents may be employed without departing from the scope hereof as defined by the claims.

What is claimed is:

1. A method comprising:

determining a prediction network that is trained to map a contextual taxonomy to a standard taxonomy;

receiving an indication of a break that is going to be experienced during playback of an instance of main content, wherein a client device is playing back the instance of main content;

determining a set of contextual tags based on content associated with the break in the instance of main content;

mapping, using the prediction network, the set of contextual tags to a set of standard tags from the standard taxonomy;

determining an instance of supplemental content based on the set of standard tags; and providing information to insert the instance of supplemental content in the break during a playback of the instance of main content to the client device.

2. The method of claim 1, wherein the prediction network is trained by:

adjusting parameters of the prediction network based on the mapping of contextual tags in the contextual taxonomy to standard tags in the standard taxonomy.

3. The method of claim 2, further comprising:

comparing labels including values for the standard tags to the standard tags to determine a difference; and adjusting the parameters to minimize the difference.

4. The method of claim 1, wherein determining the set of contextual tags based on the instance of main content comprises:

using a machine learning process that analyzes the content within a threshold of the break in the instance of main content to determine the set of contextual tags.

5. The method of claim 4, further comprising:

storing the set of contextual tags for retrieval when the indication of the break is received.

6. The method of claim 1, wherein mapping, using the prediction network, the set of contextual tags to the set of standard tags comprises:

inputting the set of contextual tags into a language encoder that is trained to generate a set of representations for the set of contextual tags; and inputting the set of representations into a classifier that is trained to generate the set of standard tags.

7. The method of claim 6, wherein:

the language encoder analyzes the set of contextual tags bidirectionally to determine the set of representations.

8. The method of claim 6, wherein:

the classifier selects the set of standard tags based on a ranking of standard tags in the standard taxonomy.

9. The method of claim 6, wherein training the language encoder comprises:

inputting contextual tags into the language encoder;

outputting representations for the contextual tags;

comparing labels including labeled representations values to the representations that are output to determine a difference; and adjusting parameters of the language encoder to minimize the difference.

10. The method of claim 6, wherein training the classifier comprises:

inputting contextual tags into the language encoder;

outputting representations for the contextual tags;

inputting the representations into the classifier;

outputting standard tags for the representations;

comparing labels including labeled standard tag values to the standard tags that are output to determine a difference; and adjusting parameters of the language encoder to minimize the difference.

11. The method of claim 10, further comprising:

inputting a description of the contextual tags into the language encoder, wherein the description is used to determine the representations for the contextual tags.

12. The method of claim 1, wherein determining the instance of supplemental content comprises:

sending information for the set of standard tags to a supplemental content system; and receiving information that is used to select the instance of supplemental content from the supplemental content system.

13. The method of claim 1, wherein mapping, using the prediction network, the set of contextual tags to the set of standard tags comprises:

determining the set of standard tags, wherein the mapping is sentiment aware.

14. The method of claim 1, wherein:

the contextual taxonomy includes a first hierarchy, and the standard taxonomy includes a second hierarchy, wherein the first hierarchy is different from the second hierarchy.

15. The method of claim 1, wherein:

the contextual taxonomy includes contextual tags that describe a context of the instance of main content in a different granularity than standard tags in the standard taxonomy.

16. The method of claim 1, wherein mapping, using the prediction network, the set of contextual tags to the set of standard tags comprises:

determining weights for the set of contextual tags; and applying the weights in the prediction network to determine the set of standard tags.

17. The method of claim 16, wherein the weights are determined based on a respective distance from a standard tag to the break.

18. A non-transitory computer-readable storage medium having stored thereon computer executable instructions, which when executed by a computing device, cause the computing device to be operable for:

determining a prediction network that is trained to map a contextual taxonomy to a standard taxonomy;

receiving an indication of a break that is going to be experienced during playback of an instance of main content, wherein a client device is playing back the instance of main content;

determining a set of contextual tags based on content associated with the break in the instance of main content;

mapping, using the prediction network, the set of contextual tags to a set of standard tags from the standard taxonomy;

determining an instance of supplemental content based on the set of standard tags; and providing information to insert the instance of supplemental content in the break during a playback of the instance of main content to the client device.

19. The non-transitory computer-readable storage medium of claim 18, wherein mapping, using the prediction network, the set of contextual tags to the set of standard tags comprises:

inputting the set of contextual tags into a language encoder that is trained to generate a set of representations for the set of contextual tags; and inputting the set of representations into a classifier that is trained to generate the set of standard tags.

20. An apparatus comprising:

one or more computer processors; and a computer-readable storage medium comprising instructions for controlling the one or more computer processors to be operable for:

determining a prediction network that is trained to map a contextual taxonomy to a standard taxonomy;

receiving an indication of a break that is going to be experienced during playback of an instance of main content, wherein a client device is playing back the instance of main content;

determining a set of contextual tags based on content associated with the break in the instance of main content;

mapping, using the prediction network, the set of contextual tags to a set of standard tags from the standard taxonomy;

determining an instance of supplemental content based on the set of standard tags; and providing information to insert the instance of supplemental content in the break during a playback of the instance of main content to the client device.

* * * * *